Nov. 30, 1937.   L. F. LEVY   2,100,967
CAMERA
Original Filed Feb. 11, 1935
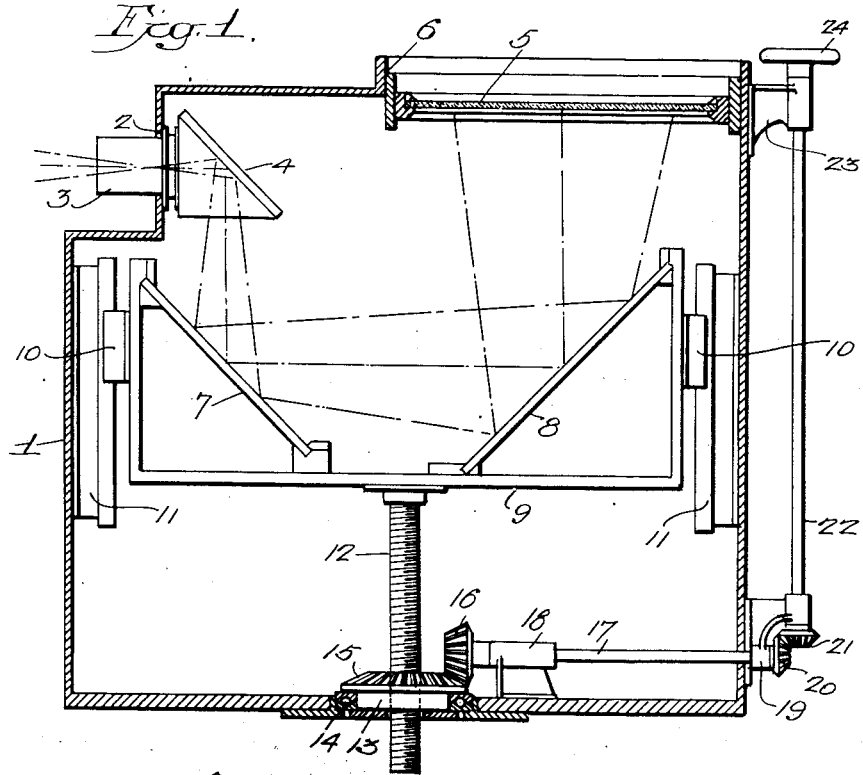
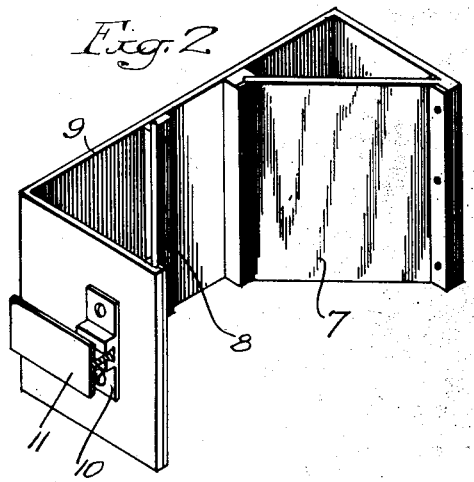
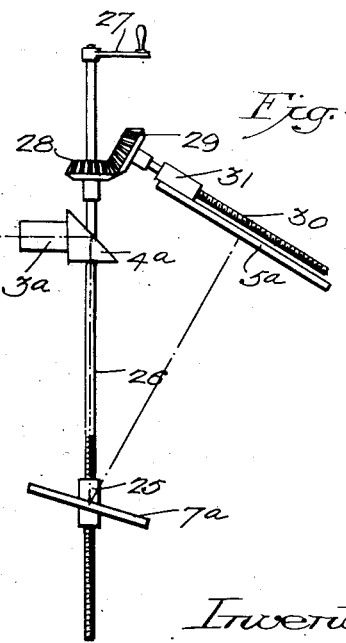
Inventor
Lionel F. Levy
by his Attorneys
Howson & Howson Patented Nov. 30, 1937

2,100,967

UNITED STATES PATENT OFFICE 2,100,967

CAMERA

Lionel F. Levy, Philadelphia, Pa., assignor of fifty one-hundredths to Howard S. Levy, Feasterville, Pa.

Application February 11, 1935, Serial No. 6,113
Renewed May 4, 1937

2 Claims. (Cl. 95—45)

This invention relates to light ray projection devices and, more particularly, to photographic devices. The principal object of the invention is to provide an improved device of this character having novel focusing means which requires less movement of the movable focusing elements than the variation in the light ray path required to obtain the desired focus in any particular instance. This object is obtained by the provision of a revertive light ray path and a reflecting device or devices adjustably arranged in the said path so as to vary simultaneously a plurality of portions of the path without changing its directions.

Another object of the invention is to provide an improved camera construction which is compact and in which the photographic plate or image field is most conveniently located.

Other objects and features of the invention will appear as the description proceeds. Reference may now be had to the accompanying drawing illustrating different embodiments of the invention.

In the drawing:

Fig. 1 is a sectional elevational view of a camera or like device embodying the principles of the invention in a preferred form thereof;

Fig. 2 is a perspective view of the adjustable focusing unit; and

Fig. 3 illustrates the essential parts of a modified form of the invention in cooperative relation.

Referring particularly to Fig. 1, the device shown comprises a casing or housing 1 having an opening at 2 within which the lens barrel 3 is supported. A light-transmitting prism 4 is carried at the inner end of the lens barrel and is adapted to receive light entering the device through the lens barrel and to reflect the light in the manner illustrated by the broken lines. It will be understood, however, that the relative positions of these elements may be varied; for example, the prism could be located at the outer end of the lens barrel.

The photographic plate or other such element, constituting an image field, is shown at 5, this plate being mounted within the opening 6 located at the top of the housing toward the rear thereof. It will be understood that a half tone screen may be employed and the device is capable of any desired use requiring any arrangement in respect to the image field. In accordance with the invention, a pair of mirrors or reflecting devices 7 and 8 are arranged to successively receive and reflect the light from prism 4 in a manner to cause the light rays to follow the revertive path illustrated by the broken lines, so that the light is finally received by the plate or image field 5. The mirrors are arranged in planes which are substantially at right angles to each other and inclined substantially at an angle of forty-five degrees to the central light ray. The mirrors are fixed in position upon a common carriage 9 which is movable as a unit for focusing. This unit is illustrated in Fig. 2.

It is contemplated by the invention to have the carriage 9 with the mirrors supported thereby movable rectilinearly toward and away from the plate or image field 5, and any suitable adjustable mounting of the carriage may be employed for this purpose. In the specific device illustrated, the side walls of the carriage carry recessed or slotted guide brackets 10 (see Fig. 2) which are slidably mounted upon the guide rails 11 carried by opposed side walls of the housing or casing. The carriage 9 is seated upon and attached to the threaded shaft 12 which extends through and threadedly engages the rotatable support member 13. This member is mounted for rotation upon the bearing 14 and is provided with a beveled gear 15 which meshes with a similar gear 16. The gear 16 is carried at the end of shaft 17 which is journaled in the bearing 18 and the external bracket 19 carried by the casing wall. A beveled gear 20 is carried at the other end of shaft 17 and meshes with a similar gear 21 carried at the lower end of shaft 22. This shaft is rotatably carried by the brackets 19 and 23 and carries at its upper end the hand wheel 24.

It will now be seen that rotation of shaft 22 by the manual turning of the hand wheel 24 will cause corresponding rotation of shaft 17 which, in turn, will rotate the support member 13 and cause the carriage 19 to move up or down depending upon the direction of movement of the hand wheel. This simultaneous adjustment of the mirrors 7 and 8 varies two of the portions of the revertive light path extending between the lens and the photo-sensitive surface without changing the directions of the said path. It will be seen that in the specific device illustrated, the movement of the carriage 9 required for focusing in any particular instance is one-half the required variation of the light path for that particular focusing, because the light path is varied by an amount which is twice the distance which the mirrors are moved. By this arrangement, the focusing operation is greatly facilitated and the time required for focusing is materially shortened.

In Fig. 3, there is illustrated a modified form of the invention wherein a single mirror is employed. The parts corresponding to those of the above-described device are designated by similar reference characters, the single mirror or reflecting device being shown at 7a. In this case, the mirror is carried by an internally threaded sleeve 25 which is carried by the threaded portion of the rotatable shaft 26. Crank arm 27 is provided at the upper end of this shaft to enable manual rotation of the same. A beveled gear 28 is mounted upon the shaft 26 and meshes with a similar gear 29 carried at the end of the threaded shaft 30. An internally threaded sleeve 31 carries the photographic plate or image field 5a.

The mirror 7a is arranged to reflect the light from prism 4a at a predetermined angle of reflection toward the plate 5a. It will be seen that there is a revertive light path provided between the prism 4a and the plate or image field 5a, and that movement of the mirror by the rotation of crank 27 will vary two portions of the said light path without changing its direction. In other words, the angle of reflection of light from the mirror is maintained at a constant value.

The purpose of having the plate 5a movable simultaneously with the movement of the mirror 7a is to maintain the plate or image field in proper relation to the mirror throughout the range of adjustment of the mirror and for any adjusted position thereof, and, more specifically, to maintain the central light ray at the center of the plate. The gear ratio and the thread pitch of the shafts are designed to effect this function. It will be seen, therefore, that rotation of shaft 26 to move the mirror 7a the required distance to obtain a desired focus will cause corresponding and related movement of plate 5a to maintain the proper position of the plate relative to the mirror. It will be understood, of course, that movement of the photographic plate or image field could be dispensed with if a sufficiently large plate were provided to cover the range of focusing.

Although two forms of the invention have been disclosed, it will be understood that other specific forms are possible and that various changes and modifications are possible without departing from the scope of the invention as defined in the appended claims.

I claim:

1. In a photographic device including supporting means for a photo-sensitive surface, the combination of a lens, reflecting means having at least one reflecting surface arranged to reflect an image revertively from said lens to a photo-sensitive surface arranged on said supporting means, and means for adjusting said reflecting means toward or from said lens and said photo-sensitive surface to focus the image on said photo-sensitive surface, whereby the light path between said lens and said photo-sensitive surface shortens or lengthens more than the movement of the reflecting means toward or from said lens and said reflecting surface.

2. In a photographic device including supporting means for a photo-sensitive surface, the combination of a lens, reflecting means having a reflecting surface arranged to reflect an image revertively from a lens to said photo-sensitive surface arranged on said supporting means, means for adjusting said reflecting means toward or from said lens and said photo-sensitive surface to focus the image on said photo-sensitive surface, whereby the light path between said lens and said photo-sensitive surface shortens or lengthens more than the movement of the reflecting means toward or from said lens and said photo-sensitive surface, and means operable conjointly with said adjusting means for moving said photo-sensitive surface in accordance with the movement of said reflecting means to maintain the image in a substantially fixed position on said photo-sensitive surface for all positions of said reflecting means with respect to said lens and said photo-sensitive surface.

LIONEL F. LEVY.